United States Patent
Milo

(10) Patent No.: US 8,009,690 B2
(45) Date of Patent: Aug. 30, 2011

(54) WIND TURBINE DATA ACQUISITION SYSTEM

(75) Inventor: Anders Holm Milo, Maarslet (DK)

(73) Assignee: Vestas Wind Systems A/S, Randers SV (DK)

( * ) Notice: Subject to any disclaimer, the term of this patent is extended or adjusted under 35 U.S.C. 154(b) by 0 days.

(21) Appl. No.: 12/869,189

(22) Filed: Aug. 26, 2010

(65) Prior Publication Data

US 2011/0049887 A1    Mar. 3, 2011

Related U.S. Application Data

(60) Provisional application No. 61/309,874, filed on Mar. 3, 2010.

(30) Foreign Application Priority Data

Aug. 28, 2009 (DK) .................................. 2009 70105

(51) Int. Cl.
*H04J 1/16* (2006.01)
*H04L 12/28* (2006.01)
(52) U.S. Cl. ..................... 370/419; 370/252; 370/386
(58) Field of Classification Search .............. 370/252, 370/386, 419
See application file for complete search history.

(56) References Cited

U.S. PATENT DOCUMENTS

| | | | | |
|---|---|---|---|---|
| 6,594,612 | B2 * | 7/2003 | Moch ........................... | 702/123 |
| 2007/0086893 | A1 | 4/2007 | Pedersen | |
| 2008/0078228 | A1 * | 4/2008 | Nies ............................. | 73/1.01 |
| 2010/0060000 | A1 * | 3/2010 | Scholte-Wassink ........... | 290/44 |

FOREIGN PATENT DOCUMENTS

| | | |
|---|---|---|
| EP | 1359321 A1 | 11/2003 |
| EP | 1985848 A2 | 10/2008 |
| WO | 2009109655 A1 | 9/2009 |

OTHER PUBLICATIONS

Danish Patent and Trademark Office, Search Report issued in related Denmark Patent Application Serial No. PA 2009 70105 dated Mar. 12, 2010.
European Patent Office, International Search Report issued in related International application No. PCT/EP2010/062497 dated Apr. 18, 2011.

* cited by examiner

*Primary Examiner* — John Pezzlo
(74) *Attorney, Agent, or Firm* — Wood, Herron & Evans, LLP

(57) ABSTRACT

Sensor networks, methods and computer program products for state monitoring of a wind turbine. The sensor network may include one or more standard sensor modules each having a sensor for measuring a parameter of the wind turbine or its surroundings. The wind turbine includes a processor for receiving input from the one or more standard sensor modules, and a data transfer channel for transferring sensor output from the one or more standard sensor modules to the processor. The data transfer channel has one or more auxiliary connection points for connection of one or more additional sensor module. The one or more additional sensor modules are in surplus of the standard sensor modules in a standard set-up of the wind turbine sensor network. The embedded turbine data acquisition system takes advantage of an existing turbine back-bone network for data transport.

14 Claims, 3 Drawing Sheets

WIND TURBINE DATA ACQUISITION SYSTEM

CROSS-REFERENCE TO RELATED APPLICATIONS

The present application claims the benefit of U.S. Provisional Application No. 61/309,874, filed Mar. 3, 2010, and claims priority under 35 U.S.C. §119 to Danish Patent Application 2009-70105, filed Aug. 28, 2009. The content of each of these applications is hereby incorporated by reference herein in its entirety for all purposes.

FIELD OF THE INVENTION

The present invention relates to sensor networks, method, and computer program products for state monitoring of a wind turbine.

BACKGROUND OF THE INVENTION

In wind turbines, a range of parameters are measured at regular intervals or on an on-going basis in order to monitor the state of the wind turbine generator, the power output by the wind turbine generator as well as parameters relating to the environment of the wind turbine generator. Such parameters are e.g the pitching of blades, yaw angle, properties of generated electricity, wind speed, temperature, etc. However, every once in a while, a need for measurement of non-standard parameters occurs, such as parameters which the wind turbine is not by standard arranged to measure; such non-standard parameters may e.g. be gear box coupling, extreme pitch loads or gear stay slip (that is registration of movement between gear box and gear stay).

Today, when such non-standard data is to be measured, a data acquisitions system (DAQ system) must be installed and calibrated in the wind turbine in question for acquisition of the specific non-standard data. A DAQ system comprises relevant sensors, typically to be positioned in the hub or the nacelle of a wind turbine, as well as means for transporting measurement data to a processor in the bottom of the tower for export thereof from the wind turbine, e.g. to a power plant controller and/or to an external server.

This installation and calibration of a specific DAQ system is time consuming and thus expensive. The transfer of data from sensors in the hub and/or the nacelle of a wind turbine to a processor or controller in the wind turbine tower and/or to a server remote from the wind turbine is done wirelessly or cabled (e.g. optical cable). The wireless data connections are not always successful and the cabled data connections typically comprise the installation of a lot of cables. Therefore, the designing, implementation and installation of a measurement system for measuring non-standard parameters of a wind turbine are cumbersome and time consuming.

Hence, an improved data acquisition system for providing measurement of non-standard parameters in wind turbines would be advantageous, and in particular a data acquisition system with shorter installation time would be advantageous.

SUMMARY OF THE INVENTION

Accordingly, embodiments of the invention preferably seek to mitigate, alleviate or eliminate one or more of the above mentioned disadvantages singly or in any combination. In particular, the present invention may provide a sensor network that solves the above mentioned problems of the prior art with regard to the time consumption of obtaining measurement data from non-standardized parameters within a wind turbine. Moreover, the cost of instrumentation a wind turbine with non-standard and/or data acquisition sensor modules is reduced significantly. Due to the lower cost of instrumentation it becomes possible to perform measurements that typically would not be conducted due to the costs; such measurements may add significant knowledge on the performance of the components within a wind turbine.

In one embodiment of the invention, a sensor network is provided for state monitoring of a wind turbine. The sensor network comprises one or more standard sensor modules, a processor for receiving input from said one or more standard sensor modules, and data transfer means or a data transfer channel for transferring sensor output from said one or more standard sensor modules to said processor. Each standard sensor module comprises a sensor for measuring a parameter of the wind turbine or its surroundings. The data transfer channel comprises one or more auxiliary connection points for connection of one or more additional sensor modules. The one or more additional sensor modules are in surplus of the standard sensor modules in a standard set-up of the wind turbine sensor network.

The embodiments of the invention are particularly, but not exclusively, advantageous for obtaining a sensor network wherein the time for installation and calibration of auxiliary sensor modules not used in the standard-setup of sensors in a wind turbine is reduced significantly. Such auxiliary sensor modules may be sensor modules arranged for measuring some parameters, which are only to be measured for a short period of time. An auxiliary sensor module comprises an appropriate sensor or appropriate sensor means, such as a transducer, arranged to detect a parameter in one form and report it in another form in the form of an analog or digital output signal.

The data transfer between an auxiliary sensor module and a relevant processor within or outside the wind turbine is provided by the existing data transfer means or channel within the turbine which eliminates the need for installating separate data transfer means or data transfer channels in the form of cables or wireless data transmission means (or a wireless data transmission channel) for transmitting data from auxiliary sensor modules.

The invention thus provides for free connection points available for connection of non-standard sensor modules. The connection of the non-standard sensor modules will typically be intermediate in that the parameters of the wind turbine relevant to the normal or standard operation thereof are sensed by means of the one or more standard sensor modules. Moreover, a measurement system or data acquisition system for measuring non-standard data of a wind turbine thus becomes a more integrated part of the wind turbine in that the signals from the auxiliary sensor modules may be transferred via the existing network within the wind turbine to a data acquisition system controller connected to the existing network.

Since a plurality of connection points may be provided, the sensor network is scalable with regards to the number and types of auxiliary sensor modules that may be connected at the connection points.

Moreover, due to the reduced time for implementing a data acquisition system with auxiliary sensor modules according to the invention, measurements that would normally not be conducted due to expensive and time consuming installations may become feasible, providing further information on the wind turbine.

It should be noted that the term "state monitoring" is meant to denote the measurement of data relevant to the operation of the wind turbine and by means of sensor modules installed within the wind turbine; such data may e.g. be data on the electrical output of the wind turbine, such as active and/or reactive power and/or frequency, data on the environment, such as temperature, wind direction, wind speed.

The data transfer channel may be a backbone network arranged for interconnecting the sensor modules of the wind turbine and one or more processors for collecting the data from the sensor modules and if relevant providing local or remote access to the collected data. The backbone network may e.g. be a CAN network for internal communication and control within the wind turbine.

According to one embodiment, the auxiliary connection points are hardware interfaces to data acquisition DAQ modules. Such DAQ modules may comprise any appropriate sensor, transducer or measurement device, e.g. a microphone for detecting noise level, strain gauges and a rotary encoder for measurement of a gear box coupling, pressure transducers in the hub for registering extreme pitch loads, laser distance sensors for registering movement between gear box and gear stay.

According to another embodiment, the data transfer channel of the sensor network is preferably dimensioned so as to facilitate data transfer from the standard sensor modules as well as from the additional sensor modules connected to auxiliary connection points. Thus, the data transfer channel is preferably over-dimensioned or oversized so as to be able to transmit measurement data emanating from the standard sensor modules comprised in the standard setup of sensor modules of the wind turbine as well as measurement data from additional sensor modules connected to the auxiliary connection points.

According to yet another embodiment, the sensor network moreover comprises a data acquisition server connection point and the data transfer channel is arranged for transferring sensor output from said additional sensor module(s) connected to auxiliary connection point(s) to a data acquisition server connected to the data acquisition server connection point. The data acquisition server may be a DAQ system controller arranged for configuring and/or calibrating the DAQ system and for storing the data from the auxiliary sensor modules received via the data transfer channel of the sensor network. The data acquisition server connection point may be located in the tower of the wind turbine, preferably at or close to the bottom thereof.

According to yet another embodiment, the sensor network further comprises a data acquisition server connected to said data acquisition server connection point, where the data acquisition server is arranged for configuring the setup of said one or more additional sensor modules connected to the sensor network via the auxiliary connection points and/or arranged for logging output data from said one or more additional sensor modules. The configuration of the setup of the one or more additional sensor modules may comprise the calibration of the one or more additional sensor modules. Preferably, the data acquisition server is accessible locally and remotely. Local accessibility of the data acquisition server relates to accessibility of the server and its operation by a person at or within the wind turbine, whilst remote accessibility to the data acquisition server relates to the access to it from a computer or processor placed at a distance from the wind turbine, for instance via the internet.

In a further embodiment, the one or more auxiliary connection points comprise a standard connection module with a standard configuration and a converter module for receiving a signal from an auxiliary sensor module connected to the converter module and for outputting a conditioned sensor signal to the standard connection module. Hereby, the converter module may be arranged for receiving an input signal from any among a plurality of different types of auxiliary sensors, for conditioning the input signal from the auxiliary sensor modules into a signal compatible with the standard connection module.

As an example, the following sensor modules are mentioned as sensor modules that may be realized by use of converter modules:
Strain gauge
Current sensor
Voltage sensor
Temperature sensor
Digital sensor Alternatively or additionally, each auxiliary connection points of said one or more auxiliary connection points is of a specific type arranged to be connected to a specific type of sensor and thus arranged to receive sensor input signals of a specific type. Thus, the one or more auxiliary connection points comprise different types of connection points in order to facilitate different types of input signals from different types of auxiliary sensor modules. In this case, the types of auxiliary connection points must be chosen so as to be compatible to appropriate or relevant auxiliary sensor modules, where the auxiliary sensor modules in question may be connected directly to the relevant connection point of the appropriate type without the use of an intermediate converter module.

Preferably, the data transfer channel is a wired or wireless backbone data transfer network of the wind turbine arranged to transfer data from the hub and/or the nacelle of the wind turbine to a processor in the tower of the wind turbine.

According to a further embodiment, the auxiliary connection points are located in one or more of the following locations: the hub, the nacelle, the tower of the wind turbine. It should be noted that a plurality of auxiliary connection points may be provided, e.g. in the order of tens of connection points, even 100 or more connection points.

The connection points in the nacelle may be connection points for auxiliary sensor modules for measuring temperature, pressure, flow, voltage, current, load and position. The connection points in the hub may be connection points for auxiliary sensor modules on wings, pitch systems, gearbox and control boxes, i.e. sensor modules for measuring temperature, pressure, flow, voltage, current, load and position. The connection points in the tower may be connection points for auxiliary sensor modules for measuring bending, elongation and/or strain, i.e. from strain gauges.

According to another aspect, the invention is related to a method of obtaining measurement data from non-standard parameters of or at a wind turbine, where the wind turbine comprises a sensor network for state monitoring of a wind turbine, the sensor network comprising one or more standard sensor modules, each standard sensor module comprising a sensor for measuring a parameter of the wind turbine or its surroundings; a processor for receiving input from said one or more standard sensor modules; data transfer means or a data transfer channel for transferring sensor output from said one or more standard sensor modules to said processor, wherein the method comprises the steps of: mounting an additional sensor module within the wind turbine or in relation to the wind turbine in order to measure the non-standard parameter of or at the wind turbine; and connecting the additional sensor module to an auxiliary connection point of the data transfer channel, said auxiliary connection point being arranged for connection of one or more additional sensor modules in surplus of standard sensor modules in a standard set-up of the wind turbine sensor network.

The method provides advantages corresponding to the advantages of the first aspect of the invention. Thus, they will not be described in further detail here.

According to an embodiment of the method it further comprises the steps of providing data transfer between the one or more additional sensor modules and a data acquisition server via the data transfer channel, and calibrating the one or more additional sensor module from the data acquisition server.

According to a third aspect, the invention relates to a computer program product being adapted to enable a computer system comprising at least one computer having a data storage channel associated therewith to perform the method according to the invention.

The first, second and third aspect of the present invention may each be combined with any of the other aspects. These and other aspects of the invention will be apparent from and elucidated with reference to the embodiments described hereinafter.

BRIEF DESCRIPTION OF THE FIGURES

The present invention will now be explained, by way of example only, with reference to the accompanying Figures, where.

Like reference numerals are meant to denote like elements throughout the drawings.

DETAILED DESCRIPTION

Figure 1:
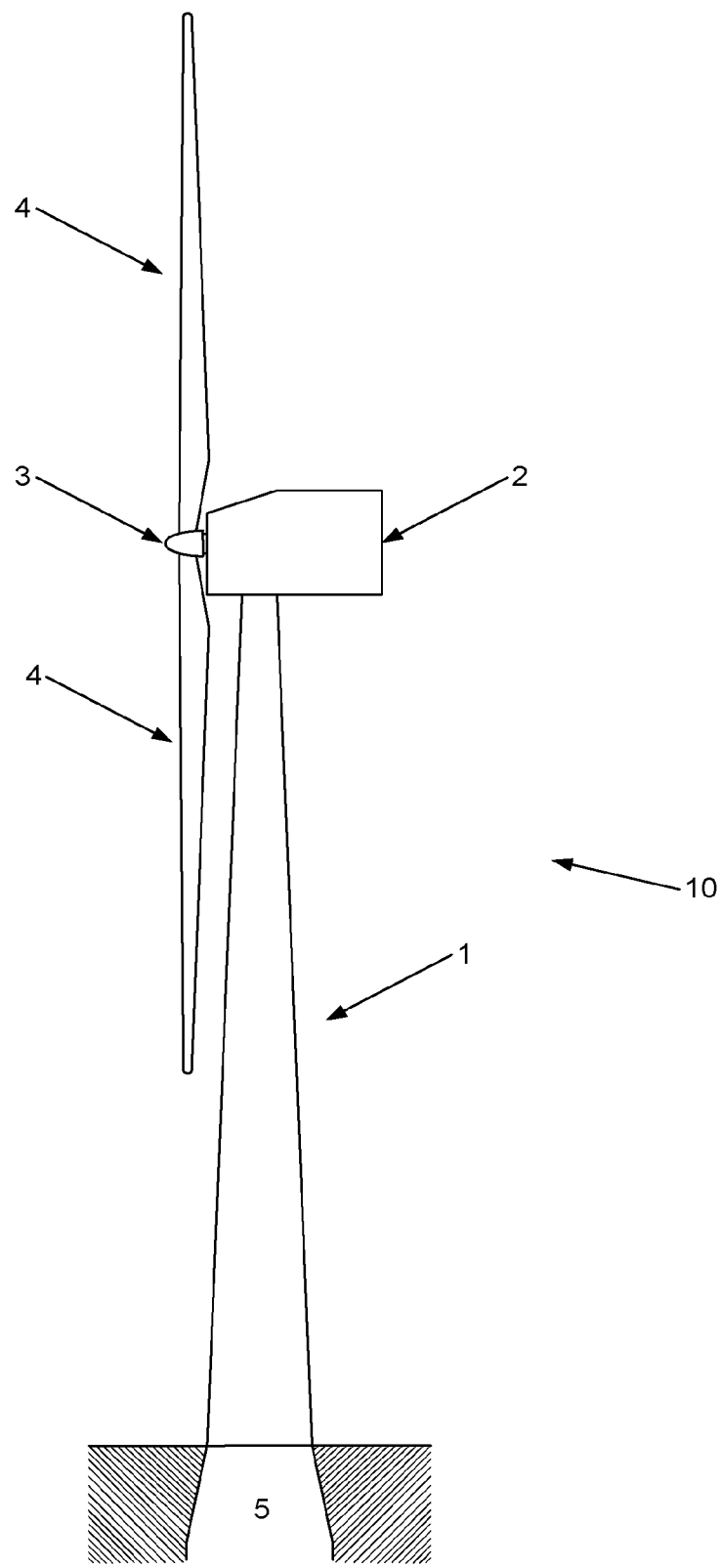
FIG. 1 is a schematic drawing of a wind turbine.

FIG. 1 shows a wind turbine generator 10. The wind turbine generator 10 includes a tower 1 having a number of tower sections (not shown in FIG. 1), a nacelle 2 positioned on top of the tower 1, and a rotor extending from the nacelle 2. The tower 1 is erected on a foundation 5 built in the ground. The rotor is rotatable with respect to the nacelle 2, and includes a hub 3 and one or more blades 4. The rotor is arranged to be brought into rotation in respect to the nacelle 2 by wind incident on the blades 4. The mechanical energy from the rotation of the rotor is converted into electrical energy by a generator 7 (see FIG. 2) in the nacelle 2. The electrical energy is subsequently converted to a fixed frequency electrical power to be supplied to a power grid. The wind turbine generator 10 may also form part of a wind power plant comprising a plurality of wind turbines generators 10. Although the wind turbine generator 10 shown in FIG. 1 is shown as having two blades 4, it should be noted that a wind turbine generator may have different number of blades; a typical number of blades is three, but it is common to find wind turbines having one to four blades. The wind turbine generator 10 shown in FIG. 1 is a Horizontal Axis Wind turbine (HAWT) as the rotor rotates about a substantially horizontal axis. It should be noted that the rotor may rotate about a vertical axis. Such a wind turbine generator having its rotor rotates about the vertical axis is known as a Vertical Axis Wind Turbine (VAWT). The embodiments described henceforth are not limited to HAWT having two blades. They may be implemented in both HAWT and VAWT, and in wind turbine generators having any appropriate number of blades 4 in the rotor.

Figure 2:
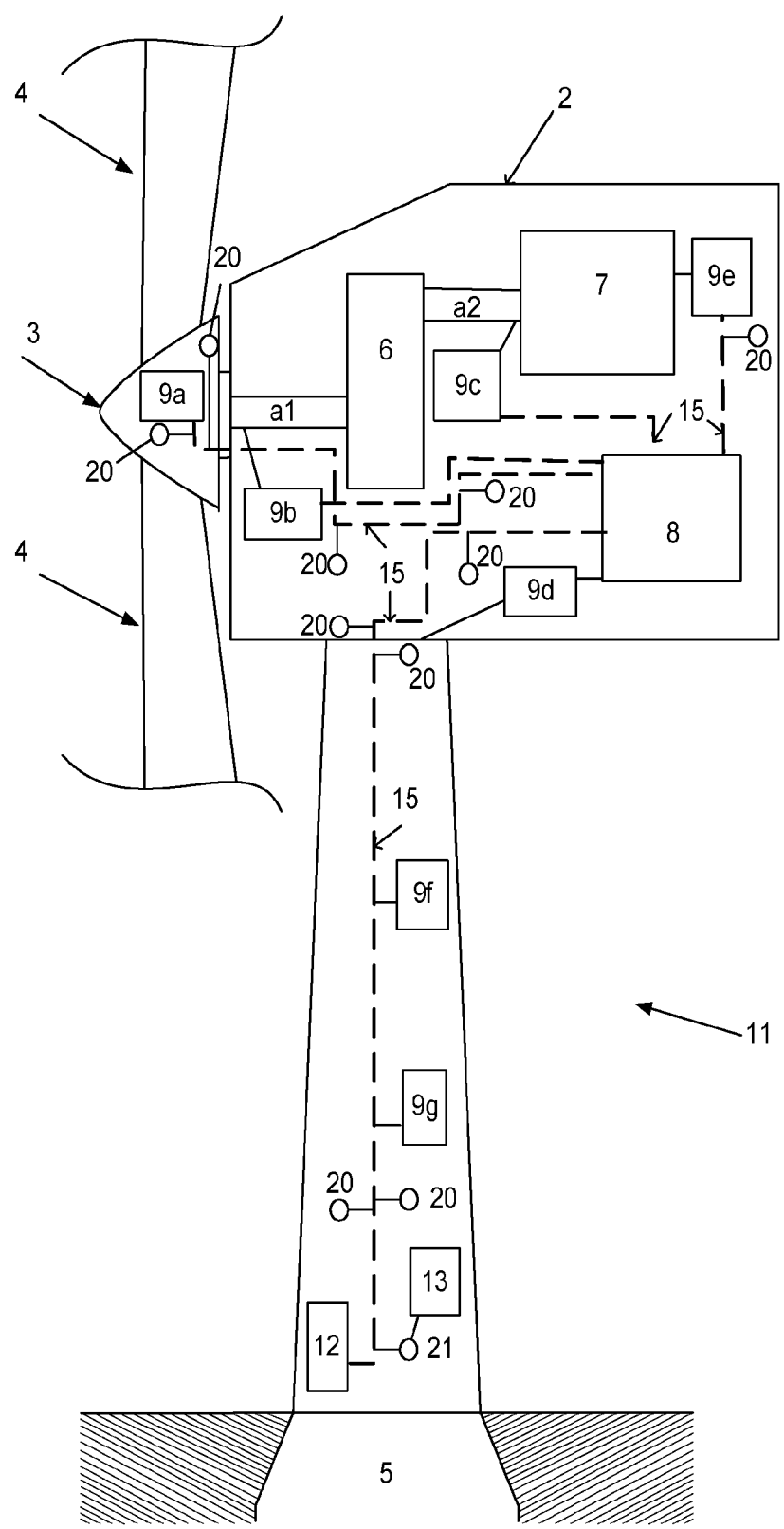
FIG. 2 is a cross-section of an example of wind turbine comprising the sensor network according to the invention.

FIG. 2 is a cross-section of an example of wind turbine generator 11 comprising the sensor network (8, 9a-9g, 15, 20). It should be noted that the components of the wind turbine generator 11 have been distorted in FIG. 2 for the sake of clarity; thus, the elements of FIG. 2 are not to scale compared to each other. Moreover, the blades 4 of the wind turbine 10 are shown as truncated.

The tower 1, nacelle 2, hub 3, blades 4 and foundation 5 of the wind turbine generator 11 have already been explained in connection with FIG. 1 and will therefore not be described in further detail in connection with FIG. 2.

Only the relevant components within the wind turbine generator 11 are shown in the cross section of FIG. 2. FIG. 2 discloses that the hub 3 is connected to an axis a1 which in turn is connected to a gear 6. The gear 6 is in turn connected to the generator 7 of the wind turbine generator 11.

The rotor is arranged to be brought into rotation in respect to the nacelle 2 by wind incident on the blades 4. The generator 7 is arranged to convert the mechanical energy from the rotation of the rotor into electrical energy. No electrical power cables for outputting electrical energy from the generator 7 is shown in FIG. 2. The nacelle 2 moreover comprises other components, such as a power converter (not shown in FIG. 2); however, these other components are not shown in FIG. 2 or described in more detail since they are not relevant to the description of the present example of the wind turbine generator 11.

Figure 3:
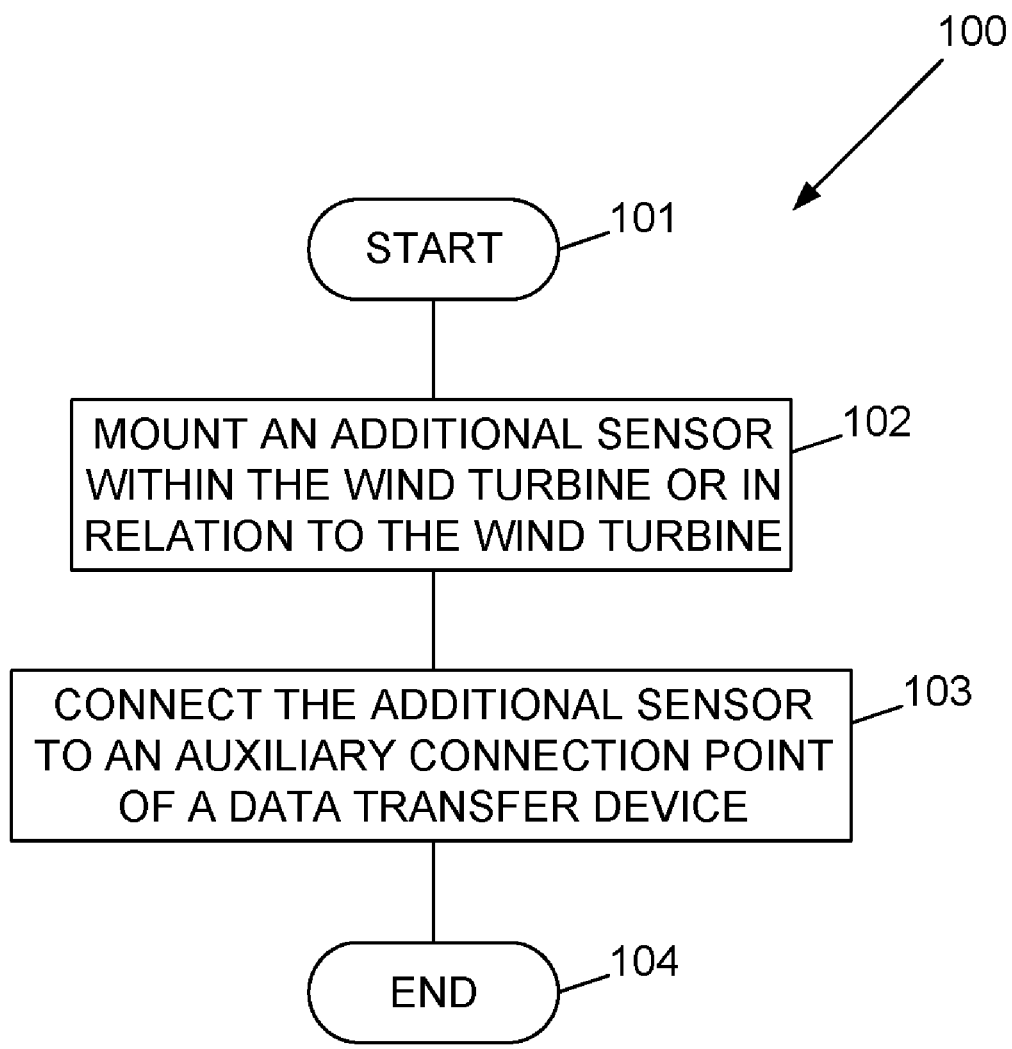
FIG. 3 is a flow-chart of a method according to the invention.

With continued reference to FIG. 3, the sensor network comprises a controller 8 placed in the nacelle 2 and connected via communication lines 15 to sensors modules 9a, 9b, 9c, 9d, 9e, 9f, 9g. Each sensor module 9a, 9b, 9c, 9d, 9e, 9f, 9g is connected to or comprises a measurement sensor (not shown in FIG. 2) for sensing a parameter of the wind turbine. The communication lines 15 are shown as broken lines in FIG. 2. The sensor module 9a is placed in the hub 3. The sensor module 9b is placed within the nacelle 2 in connection to the shaft a1 from the hub 3 to the gear 6. The sensor module 9c is placed within the nacelle 2 in connection to the shaft a2 from the gear 6 to the generator 7. The sensor module 9d is placed within the nacelle 2 in connection to the yaw mechanism between the nacelle and the tower 1. The sensor module 9e is placed within the nacelle 2 in connection to the generator 7. The sensor modules 9f and 9g are placed within the tower 1. The sensor modules 9a-9g are meant to be examples of sensor modules used within the wind turbine in order to monitor the status of the components of the wind turbine during its normal operation. Even though only a few sensor modules 9a-9g have been shown in FIG. 2, it should be noted that any appropriate number of sensor modules may be incorporated within the sensor network of a wind turbine, e.g. in the magnitude of tens or many tens of sensor modules.

The wind turbine 11 moreover comprises a controller 12 placed in the bottom of the tower 1. The controller 12 is connected to the controller 8 via the communication lines 15. Typically, the controller 12 in the tower is accessible locally, e.g. by service technicians entering the wind turbine 11, and/or remotely, e.g. by a monitoring system at a remotely placed server accessing the controller via external communication lines, such as internet connection, mobile telephone connection and/or satellite connection (not shown in FIG. 2).

The sensor network of the invention moreover comprises number of auxiliary connection points 20, each auxiliary connection point 20 being arranged for connection of an additional sensor module, where each of such additional sensor modules are in surplus of the standard sensor modules 9a-9g in a standard set-up of the wind turbine sensor network. Each auxiliary connection point 20 may be of a specific type arranged to be connected to a specific type of sensor module and thus arranged to receive sensor input signals of a specific type. Hereby, different types of input signals from different types of auxiliary sensor modules may be facilitated.

Of course, the types of auxiliary connection points should be chosen so as to be compatible to appropriate or relevant auxiliary sensors modules, where the auxiliary sensor modules in question may be connected directly to the relevant connection point of the appropriate type without the use of an intermediate converter module. An auxiliary sensor module comprises an appropriate sensor or an appropriate measurement means or sensor, such as a transducer, arranged to detect a parameter in one form and report it in another form in the form of an analog or digital output signal.

Alternatively or additionally, one or more of the auxiliary connection points 20 may comprise a standard connection module with a standard configuration and a converter module (not shown in the Figures) for receiving a signal from an auxiliary sensor module connected to the converter module and for outputting a conditioned sensor signal to the standard connection module. Hereby, the auxiliary connection points 20 comprising such a converter module may be connected to and receive input signal from a variety of sensor modules.

The sensor network moreover comprises a connection point 21 arranged for connection to a data acquisition server. In FIG. 2, a data acquisition server 13 is shown as connected to the connection point 21. The data acquisition server 13 may be arranged for receiving signals from auxiliary sensors connected to the connection points 20. The data acquisition server 13 may moreover be arranged to storing the signals received from the auxiliary sensors and/or forwarding them to a remote server (not shown in FIG. 2). Moreover, the data acquisition server 13 may be arranged to configure and calibrate additional sensor modules connected to the auxiliary connection points 20.

As a few examples of auxiliary sensor modules may be:
Sensors for sensing position of gear box coupling;
Sensors for sensing pitch loads;
Sensors for registration of gear stay movement;
Sensors for detecting noise level.
Gear Box Coupling:

Auxiliary sensor modules may include three strain gauges and one rotary encoder in the hub. Signals may be transferred wirelessly to the controller 8 in the nacelle and subsequently sent to the DAQ server 13 or the controller 12 at the bottom of the tower via fibre optical cable or a wired connection 15. The signals from the auxiliary sensor modules may subsequently be merged with turbine data. Wireless communication connections and wireless data transfer may be accomplished with transceivers, transmitters, and/or receivers and protocols as understood by a person having ordinary skill in the art.

Pitch Loads

Auxiliary sensor modules may include six pressure transducers. The data transfer channel or means may again be a wireless communication channel or wireless communication means 15 for transferring signals to the controller 8 in the hub 2 and fibre optical cable 15 for transferring the signals to a DAQ server 13 or controller 12 at the bottom of the tower 1. The signals from the auxiliary sensor modules may subsequently be merged with turbine data as well as signals from a meteorology mast.

Gear Box Movement

Auxiliary sensor modules may include six laser distance sensors to register movement of the gear box. The data transfer means or data transfer channel may again be a wireless communication connection or wireless communication means 15 for transferring signals to the controller 8 in the hub 2 and fibre optical cable 15 for transferring the signals to a DAQ server 13 or controller 12 at the bottom of the tower 1. The signals from the auxiliary sensor modules may subsequently be merged with turbine data as well.

In short, the invention thus provides an embedded turbine data acquisition system taking advantage of an existing turbine back-bone network for data transport by wireless and/or wired connections of a communication channel or means. Access points or connection points are available in the hub, the nacelle and the bottom of the wind turbine. The system is modular and thus scalable with regard to the number and types of channels or connection points. The data acquisition server 13 or data acquisition (DAQ) system controller is integrated by means of the connection point 21. The DAQ system controller 13 is arranged for configuring and/or calibrating the system of additional sensor modules connected to the connection points 20 as well as logging the data from the additional sensor modules. The DAQ system controller 13 is accessible both locally, i.e. at the site of the wind turbine, and remotely through any appropriate system for accessing the wind turbine, i.e. a SCADA system and/or via the controller 8.

Typically, the additional sensor modules are intermediate or interim sensor modules in the sense that they will only stay connected to the connection points of the wind turbine network for a short period of time compared to the life-time of the wind turbine, for example for a period in the magnitudes of days or weeks.

FIG. 3 is a flow-chart of a method 100 according to the invention. The method is to be performed in a wind turbine comprising a sensor network for state monitoring of a wind turbine, the sensor network comprising one or more standard sensor modules, each standard sensor module comprising a sensor for measuring a parameter of the wind turbine or its surroundings; a processor for receiving input from said one or more standard sensor modules; and a data transfer channel or data transfer means for transferring sensor output from said one or more standard sensor modules to said processor. The method starts in step 101 and continues to step 102, wherein an additional sensor module is mounted within the wind turbine or in relation to the wind turbine in order to measure the non-standard parameter of or at the wind turbine. Such a non-standard parameter may e.g. be the noise level within the nacelle, the wear of the yaw mechanism, or other.

In the subsequent step 103, the additional sensor module is connected to an auxiliary connection point of the data transfer channel or means, where the auxiliary connection point is arranged for connection of one or more additional sensor modules in surplus of standard sensor modules in a standard set-up of the wind turbine sensor network.

The method 101 ends in step 104. Alternatively, the method may optionally comprise the steps of providing data transfer between the one or more additional sensor modules and a data acquisition server via the data transfer means or data transfer channel; and configuring and/or calibrating the one or more additional sensor module from the data acquisition server (not shown in FIG. 3). The data acquisition server may moreover be arranged to receive and store any measurement data from additional sensor modules connected to the auxiliary connection points. The data acquisition server is advantageously accessible locally as well as remotely.

The method may for example be carried out by an apparatus which is suitably configured. In one embodiment, the method is carried out by a processor which is programmed with instructions to carry out the method.

The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

The controller 12 and DAQ system controller 13 may include at least one processor coupled to a memory. The memory may represent the random access memory (RAM) devices constituting the main storage of each processor and any cache memories, non-volatile or backup memories (e.g., programmable or flash memories), read-only memories, etc. The controller 12 and DAQ system controller 13 may also include one or more mass storage devices as understood by a person of ordinary skill in the art. The controller 12 and DAQ system controller 13 also typically receive a number of inputs and outputs for communicating information externally.

The controller 12 and DAQ system controller 13 generally operate under the control of an operating system, and execute or otherwise rely upon various computer software applications, components, programs, objects, modules, data structures, etc. In particular, controller 12 and DAQ system controller 13 may execute a software application, component, program, object, module, or data structure for state monitoring of a wind turbine and/or for obtaining measurement data from non-standard parameters of or at a wind turbine. In general, the routines executed to implement the embodiments of the invention, whether implemented as part of an operating system or a specific application, component, program, object, module, or data structure will be referred to herein as "computer program code", or simply "program code". The computer program code typically comprises a sequence of instructions that is resident at various times in various memory and mass storage devices in a computer, and that, when read and executed by one or more processors in a computer, causes that computer to perform the steps necessary to execute steps or elements embodying the various aspects of the embodiments of the invention.

As will be appreciated by one skilled in the art, the embodiments of the invention may also be embodied in a computer program product embodied in at least one computer readable storage medium having non-transitory computer readable program code embodied thereon. The computer readable storage medium may be an electronic, magnetic, optical, electromagnetic, infrared, or semiconductor system, apparatus, or device, or any suitable combination thereof, that can contain, or store a program for use by or in connection with an instruction execution system, apparatus, or device. Exemplary computer readable storage medium include, but are not limited to, a hard disk, a floppy disk, a random access memory, a read-only memory, an erasable programmable read-only memory, a flash memory, a portable compact disc read-only memory, an optical storage device, a magnetic storage device, or any suitable combination thereof. Computer program code containing instructions for directing a processor to function in a particular manner to carry out operations for the embodiments of the present invention may be written in one or more object oriented and procedural programming languages. The computer program code may supplied from the computer readable storage medium to the processor of any type of computer to produce a machine with a processor that executes the instructions to implement the functions/acts of a computer implemented process for sensor data collection specified herein.

Although the present invention has been described in connection with the specified embodiments, it is not intended to be limited to the specific form set forth herein. Rather, the scope of the present invention is limited only by the accompanying claims. In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality.

The invention claimed is:

1. A sensor network for state monitoring of a wind turbine, the sensor network comprising:
   one or more standard sensor modules, each standard sensor module including a sensor configured for measuring a standard parameter related to normal operation of the wind turbine or its surroundings at regular intervals or on an on-going basis;
   a processor configured for receiving input from said one or more standard sensor modules; and
   a data transfer channel configured for transferring sensor output from said one or more standard sensor modules to said processor, said data transfer channel including one or more auxiliary connection points that are free during the normal operation of the wind turbine for connection of one or more additional sensor modules configured to measure a non-standard parameter, and said one or more additional sensor modules being in surplus of the one or more standard sensor modules in a standard set-up of the wind turbine sensor network.

2. The sensor network of claim 1, wherein said auxiliary connection points are hardware interfaces to data acquisition (DAQ) modules.

3. The sensor network of claim 1, wherein the data transfer channel is dimensioned to facilitate data transfer from the one or more standard sensor modules and to facilitate data transfer from the one or more additional sensor modules connected to auxiliary connection points.

4. The sensor network of claim 1, further comprising:
   a data acquisition server connection point, the data transfer channel arranged for transferring sensor output from each additional sensor module connected to one of the one or more auxiliary connection points to a data acquisition server connected to said data acquisition server connection point.

5. The sensor network of claim 4, further comprising:
   a data acquisition server connected to said data acquisition server connection point, the data acquisition server arranged for configuring the setup of said one or more additional sensor modules connected to the one or more auxiliary connection points and/or arranged for logging output data from said one or more additional sensor modules.

6. The sensor network of claim 5, wherein the data acquisition server is accessible locally and remotely.

7. The sensor network of claim 1, wherein said one or more auxiliary connection points comprise a standard connection module with a standard configuration and a converter module for receiving a signal from an auxiliary sensor module connected to the converter module and for outputting a conditioned sensor signal to the standard connection module.

8. The sensor network of claim 1, wherein each auxiliary connection point is of a specific type arranged to be connected to a specific sensor type and thus arranged to receive sensor input signals corresponding to the sensor type.

9. The sensor network of claim 1, wherein the data transfer channel is a wired or wireless backbone data transfer network of the wind turbine arranged to transfer data from the hub and/or the nacelle of the wind turbine to a processor in a tower of the wind turbine.

10. The sensor network of claim 1, wherein said one or more auxiliary connection points are located in one or more of the hub, the nacelle, and the tower of the wind turbine.

11. A method of obtaining measurement data from non-standard parameters of or at a wind turbine, where the wind turbine comprises a sensor network for state monitoring of the wind turbine, the sensor network includes one or more standard sensor modules, each standard sensor module comprising a sensor configured for measuring a standard parameter related to normal operation of the wind turbine or its surroundings at regular intervals or on an on-going basis, a processor configured for receiving input from said one or more standard sensor modules, and a data transfer channel configured for transferring sensor output from said one or more standard sensor modules to said processor, the method comprising:

during the normal operation of the wind turbine, mounting an additional sensor module within the wind turbine or in relation to the wind turbine and configured to measure at least one of the non-standard parameters of or at the wind turbine; and connecting the additional sensor module to an auxiliary connection point of the data transfer channel, said auxiliary connection point being free during the normal operation of the wind turbine for connection of one or more additional sensor modules in surplus of standard sensor modules in a standard set-up of the wind turbine sensor network.

12. The method of claim 11, further comprising:
providing data transfer between the one or more additional sensor modules and a data acquisition server via the data transfer channel; and
configuring and/or calibrating the one or more additional sensor module from the data acquisition server.

13. The method of claim 11, wherein the data acquisition server is placed within the wind turbine, preferably at the bottom of the wind turbine tower, or remotely from the wind turbine.

14. A computer program product being adapted to enable a computer system comprising at least one computer having data storage means associated therewith to perform a method comprising:

providing a sensor network for state monitoring of a wind turbine, the sensor network includes one or more standard sensor modules, each standard sensor module comprising a sensor configured for measuring a standard parameter related to normal operation of the wind turbine or its surroundings at regular intervals or on an on-going basis, a processor configured for receiving input from said one or more standard sensor modules, and a data transfer channel configured for transferring sensor output from said one or more standard sensor modules to said processor, the method comprising:

during the normal operation of the wind turbine, mounting an additional sensor module within the wind turbine or in relation to the wind turbine and configured to measure at least one non-standard parameter of or at the wind turbine; and connecting the additional sensor module to an auxiliary connection point of the data transfer channel, said auxiliary connection point being free during the normal operation of the wind turbine for connection of one or more additional sensor modules in surplus of standard sensor modules in a standard set-up of the wind turbine sensor network.

* * * * *

UNITED STATES PATENT AND TRADEMARK OFFICE
CERTIFICATE OF CORRECTION

| | | |
|---|---|---|
| PATENT NO. | : 8,009,690 B2 | |
| APPLICATION NO. | : 12/869189 | |
| DATED | : August 30, 2011 | |
| INVENTOR(S) | : Anders H. Milo | |

It is certified that error appears in the above-identified patent and that said Letters Patent is hereby corrected as shown below:

At column 2, line number 2, after "instrumentation", insert --for--.

At column 4, line number 16, change "points" to --point--.

At column 5, line number 52, change "turbines" to --turbine-- and at line number 62, change "rotates" to --rotate--.

At column 6, line number 21, change "is" to --are-- and at line number 65, change "are" to --is--.

At column 7, line number 30, change "to" to --for--.

At column number 9, line number 58, after "may", insert --be--.

Signed and Sealed this
Eighth Day of November, 2011

David J. Kappos
*Director of the United States Patent and Trademark Office*